July 28, 1964
R. L. PATRICK ETAL
3,142,830
DESICCANT CONTAINER WITH DESICCANT SATURATION INDICATOR
Filed July 20, 1961
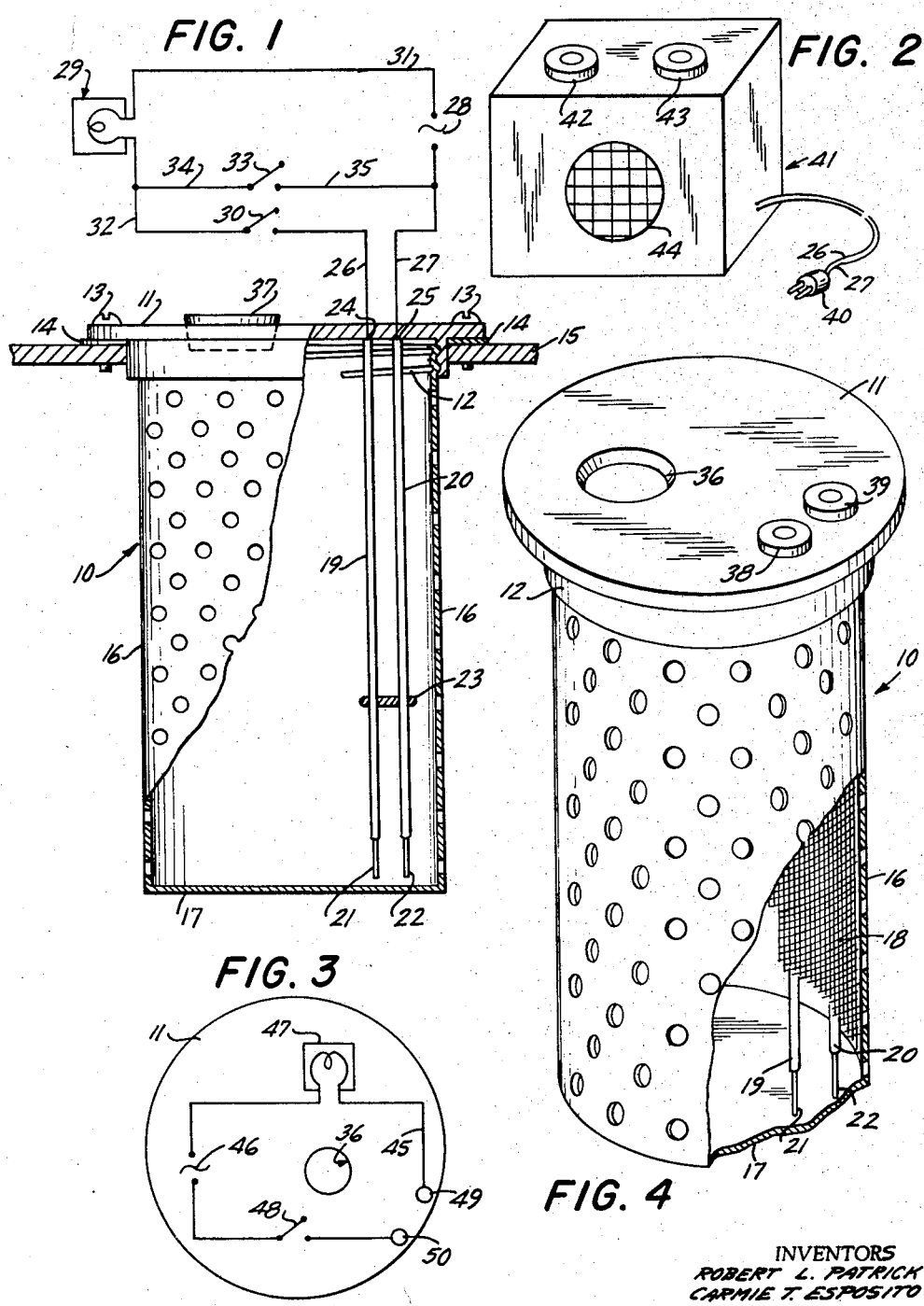
INVENTORS
ROBERT L. PATRICK
CARMIE T. ESPOSITO
BY
Pauline Newman
ATTORNEY

United States Patent Office 3,142,830
Patented July 28, 1964

3,142,830
DESICCANT CONTAINER WITH DESICCANT
SATURATION INDICATOR
Robert L. Patrick, Palos Park, and Carmie T. Esposito, Worth, Ill., assignors to Alpha Research and Development, Inc., Blue Island, Ill., a corporation of Illinois
Filed July 20, 1961, Ser. No. 125,441
6 Claims. (Cl. 340—235)

This invention relates to an indicator desiccator. More particularly, this invention relates to apparatus for both controlling the moisture content inside a sealed equipment case by means of a chemical desiccant, and externally detecting and indicating the saturation of the desiccant.

It is often necessary or desirable to maintain sensitive instruments or other equipment in an environment of controlled humidity. In order to maintain controlled moisture condition, it is the practice to contain such equipment in cases in which some moisture absorbing material has been placed, and then to seal the cases in a substantially air tight manner. In order to maintain an environment of reduced moisture content, the usual practice has been to hang bags of a chemical desiccant in the equipment cases prior to sealing. These bags of desiccant absorb water until the desiccant is saturated, at which point they must be replaced promptly, or they may drip water or salt solution into the sealed case, endangering the equipment in the case both because of lack of moisture-content control and because of possible corrosion from the dripping desiccant.

A variety of remedies have been proposed for maintaining moisture-sensitive instruments and other equipment in a dehydrating atmosphere of controlled humidity. These methods, however, have been generally cumbersome, complex, or ineffective. There exists a continuing need for a simple, accurate, efficient method for maintaining desiccant substances in closed spaces, without the concomitant need for physical inspection of the desiccant in order to determine its degree of saturation.

Accordingly, the object of the present invention is to provide an apparatus for simultaneously controlling the moisture content and indicating the condition of the desiccant inside sealed instrument cases.

Another object is to provide an efficient and compact desiccant apparatus, of such construction that sealed cases may readily be adapted to contain such an apparatus as an integral part of the case.

Another object is to provide a desiccant container which is readily filled and maintained with desiccant.

Another object is to provide a combination desiccator and indicator which is simple and economical to construct and maintain.

Another object is to provide an electrical indicator which will immediately and accurately signal whether the desiccant is saturated, without the need for physical inspection of the desiccant.

These and other objects, and attendant advantages, will become apparent from the following specification, taken with the accompanying drawings.

According to the invention, a desiccator container is adapted to contain both the desiccant and a pair of spaced electrodes, adapted to close an electrical circuit upon contact with a liquid conducting medium. The electrodes are disposed at a preselected level close to but not touching the bottom of the desiccator. The desiccator itself is adapted to be suspended within a case for moisture-sensitive equipment, in order to obtain maximum flow of air to the desiccant. Thus, the desiccator cover is fitted into the top of the equipment case, whereby the desiccator body extends into the case and the electrodes are connected through the cover of the desiccator, which cover is adapted for connection of the electrodes to an external electrical or electronic indicator.

The external indicator is an alternating current activated means for signaling the flow of current due to closure of the electrical circuit within the desiccator. It is essential that the current be alternating. Direct current is not an effective power supply in the system of this invention, due to rapid polarization of the electrodes and excessive resistance buildup. We prefer to use a simple self-contained alternating current power supply and audio indicator, connected by appropriate plug and socket means to the desiccator electrodes. Thus, when more than one of the desiccators of this invention is in use, the same indicator device can be employed to check the condition of each one. Other external signaling means, such as a simple voltmeter or glow discharge tube, may also be used.

Alternatively, each desiccator may comprise a self-sufficient unit, whereby the cover of each desiccator is fitted with a printed circuit imbedded in the cover of the desiccator, to which cover circuit are connected a small alternating current power supply and a signaling means such as a neon discharge tube. Such a self-contained system may also contain a switch for closing the external circuit to check the condition of the desiccant.

Whatever signalling means is employed, when the external indicator circuit is closed no current will flow until the desiccant has been saturated and excess moisture has caused formation of a salt solution or paste in the bottom of the desiccator, thereby completing the internal circuit.

The indicator circuit may be so constructed that the external circuit either is closed at all times, so that the indicator signal is activated immediately upon completion of the internal circuit; or the external circuit may be so constructed that the indicating signal operates only when the external circuit is closed by an operator in order to check the condition of the desiccant.

Through use of the apparatus of this invention, it is possible for an operator of moisture sensitive machinery to be advised as rapidly as his requirements demand of the condition of the desiccant inside the container. This is a substantial advantage over previous methods of checking such desiccant materials, since there has been no convenient method of evaluating the condition of such desiccant without opening the sealed instrument case. The result has been that, in practice, desiccant materials either are replaced prematurely, with resultant inconvenience in operation, or after they have become completely saturated, with resultant possible instrument damage.

The invention accordingly consists in the features of construction, combinations of elements, and arrangements of parts, which will be exemplified in the construction hereinafter described and of which the scope will be indicated in the appended claims.

In the drawings:
FIGURE 1 is a partly broken away sectional elevation and diagrammatic circuit, showing the desiccator with indicator of this invention in position for use;
FIGURE 2 is a view in perspective of a preferred embodiment of the indicator system of this invention.
FIGURE 3 is a top plan view of the desiccator cover, showing another embodiment of the indicator system of this invention; and
FIGURE 4 is a view in perspective, partly broken away, of the desiccator apparatus herein described.

The apparatus of this invention consists, in integral combination, of a desiccator member containing an internal indicating means, said indicating means comprising a pair of electrodes adapted to close an electrical circuit upon contact with a conducting liquid within the desiccator member, which conducting liquid forms when the desiccant becomes saturated with water, and an alternating current activated signaling means disposed externally to the desiccator member, for signaling closure of the electrical circuit inside the desiccator.

Referring primarily to FIGS. 1 and 4 of the drawing, the preferred embodiment of the invention illustrated therein comprises a desiccator container 10 with a removable cover member 11 which is adapted to support the desiccator container 10 in suspension therefrom, by means of threads 12 or other securing means. The cover member 11 is itself adapted to be fitted by suitable securing means, such as screws 13 and sealing disk 14, in a substantially airtight manner into the top 15 of a case for moisture-sensitive equipment or materials, as shown specifically in FIG. 1.

The container 10 consists of perforated sides 16 and an imperforate bottom 17 and may be cylindrical in shape as illustrated, or any desired shape, and may be constructed of any suitable material which can be perforated and is resistant to corrosion by the chemical desiccant, such as plastics, glass, or corrosion resistant or painted metals. The perforations on container sides 16 should be adequate in size and arrangement to permit ready circulation of air to the chemical desiccant within the container, yet small enough to retain the desiccant within the container, and should terminate at a spaced distance, in practice at least one fourth inch, from the bottom 17, so that any water or salt solution which forms is retained within the container.

In another embodiment of the invention, illustrated in FIG. 4, the desiccator sides 16 are lined with a screen 18, of metal, plastic, plastic-coated wire, or other suitable screen-forming material. The screen 18 is disposed internally and in spaced relation to the sides 16, and serves to assist in retention of desiccant fines within the desiccator and to facilitate the flow of air through the desiccator.

Vertically interiorally depended from the desiccator cover 11, and fitted herein by any suitable means, are a pair of conducting members or electrodes 19 and 20, which are arranged in parallel spaced relation with respect to each other and both of which extend to a predetermined level spaced very close to but not touching the bottom of desiccator container 10.

Electrodes 19 and 20 are preferably insulated along their length except for the electrode tips 21 and 22, which are exposed to the environment in order to make electrical contact with the conducting medium when it forms in the bottom of the desiccator, as will hereinafter be described. Electrodes 19 and 20 are held in parallel spaced relation with respect to each other by one or more suitable spacing means 23, which may be a simple plastic guide slidably fitted on the electrodes.

The upper ends of electrodes 19 and 20 are electrically connected at 24 and 25 to the external indicating circuit and signal. Said electrical connection extends outwardly through the desiccator cover 11, and is made in a suitable airtight fashion. The signaling circuit may be any suitable circuit, as shown schematically in FIG. 1, wherein wires 26 and 27 electrically connect electrodes 19 and 20 in series with a circuit containing a source of alternating current, an electrically activated alarm device or signal 29, and a switch 30 for closing the external circuit that includes the power supply 28, signal 29, and lines 31, 32, 26 and 27, all in series with electrodes 19 and 20. A second circuit, to check the operativeness of power supply 28 and signal 29 may be present, although it is not essential to the present invention. This second circuit, exemplified diagrammatically in FIG. 1, is closed by switch 33, and includes power supply 28, signal 29, and lines 31, 34 and 35. The power supply 28 of course comprises a suitable transformer means, to adjust the current to the electrical circuit employed.

The desiccator cover 11 also contains an opening 36 through which the desiccator container 10 is filled with desiccant, fitted removably with a stopper 37 adapted to fit opening 36 in an airtight seal.

In the embodiment of the invention illustrated in FIG. 4, the desiccator cover 11 is fitted with terminals 38 and 39, electrically connected to electrodes 19 and 20 respectively, which terminals are adapted conformably to receive plug 40, thereby making electrical contact with wires 26 and 27 which are in this embodiment adapted to terminate in plug 40. The external signaling means 41 shown in FIG. 2 is a self-contained power supply and signal, which may be positioned at any convenient location with respect to the equipment case 15 housing the desiccator of this invention. Said signaling means 41 embodies the electrical circuit shown in FIG. 1, and illustrates an externally disposed switch means 42, corresponding to switch 33 of FIG. 1, and a second switch means 43 corresponding to switch 30 of FIG. 1, with a speaker 44 through which an audible signal is transmitted upon completion of the electrical circuits through either of switch means 42 or 43.

External signaling means 41 is readily adapted for use in a compound assembly wherein a number of desiccators of this invention are in use. For such an assembly, switch 43 may be a rotary switch adapted to be connected in parallel with each pair of desiccator electrodes 19 and 20. An operator checking the condition of the several desiccators would merely rotate the switch to close the several desiccator circuits successively, and observe when a given desiccator circuits successively, and observe when In another embodiment of this invention, shown in FIG. 3, the desiccator with indicator is self-contained. In desiccator cover 11 is imbedded a printed circuit 45, to which is connected in series a small alternating current power supply 46, a glow bulb 47, and a switch 48. In series with this simple circuit are the electrodes 19 and 20, which are connected at terminals 49 and 50 with the printed circuit.

The device is adapted to be assembled and installed in equipment case 15, then filled with desiccant through aperture 36, closed with stopper 37, and checked periodically through the external signal means.

The desiccant, not shown, may be any solid hygroscopic agent, whose particle size is large enough that the desiccant is retained within the perforate container sides 16 or the screen 18 if used. The desiccant may be an efficiently hygroscopic inorganic salt, such as calcium chloride, or any other moisture-absorbing solid, such as silica gel. When the desiccant becomes saturated with respect to its capacity for moisture absorption and retention, excess water in the form of water or salt solution drips through the desiccant and to the bottom of container 11. To ensure electrical conductivity of this accumulated moisture, particularly if the desiccant itself does not form a conducting solution, a small amount of a soluble conducting salt such as sodium chloride crystals may be placed in the bottom of container 11 prior to filling the container with desiccant. Thus, the accumulation of excess moisture in the form of a layer of conducting liquid on the bottom of container 11, making contact with electrode tips 21 and 22, completes the portion of the indicating circuit which is within the desiccator container. The external signal is thereby activated on closing the appropriate switch which completes the portion of the indicating circuit which is external to the desiccator, showing the operator that the desiccant is saturated.

Although the preferred embodiments of this apparatus, as have been described, position the desiccator as suspended from its cover which is fitted into the top of a sealed instrument case, it is apparent that such a fitting is not essential and that the desiccator may be completely contained within the instrument case, provided that the instrument case is adapted for the passage of wires, in a substantially airtight manner, leading to and electrically connecting with the external signaling means which is an integral part of the instant invention; or the desiccator may be disposed externally to the instrument case and fitted by airtight connecting tubes to the environment within the instrument case, whereby as the air inside the instrument case is circulated through the desiccator, either by a circulating means or as a result of operation of the instruments within the case, excess moisture is absorbed and detected by the desiccator of this invention.

It is intended to cover all changes and modifications of the embodiments of this invention herein disclosed, which do not constitute departure from the spirit and scope of the invention.

That which is claimed is:

1. A device with internal detection means and external signal means comprising, in combination, a container having perforated sides and an imperforate bottom and an annular space therein for desiccant materials, means to hold and expose said desiccant materials and means to catch and retain excess moisture descending from said desiccant, a cover for said container, an internal detection means comprising a pair of spaced electrodes positioned within said container, the lower ends of said electrodes being disposed close to the bottom of said container in which said excess moisture may accumulate to form an electrical conducting medium, the other ends of said electrodes being adapted for electrical connection through said container cover to an external signal means, activated by a source of alternating current, said signal means adapted to signal closure of the electrical circuit by formation of a conducting medium bridging said spaced electrodes.

2. A device according to claim 1, wherein the cover for the container is adapted to be sealed in a substantially airtight manner in a case for moisture sensitive material, whereby said container depends within said case and said cover is positioned outside said case.

3. A device with internal detection means and external signal means comprising, in combination, a container having perforated sides and an imperforate bottom and an annular space therein for desiccant materials, means to hold and expose said desiccant materials and means to catch and retain excess moisture descending from said desiccant, a cover for said container, an internal detection means comprising a pair of spaced electrodes positioned within said container, the lower ends of said electrodes disposed close to the bottom of said container in which excess moisture may accumulate to form an electrical conducting medium, the other ends of said electrodes being adapted for electrical connection through said container cover to an external signal means, said signal means comprising a source of alternating current and an alarm device in series with said electrodes, said source having sufficient voltage to actuate the alarm device when the gap between the lower ends of said electrodes is closed by formation of said conducting medium.

4. A device according to claim 3, wherein said external signal means comprises an additional circuit containing the alarm device and energized by the voltage source and including in parallel with said spaced electrodes a manually operable switch, for testing the operability of the voltage source and the alarm device.

5. A device according to claim 3, wherein said external signal means comprises a printed electrical circuit imbedded in the cover of said container.

6. A device comprising a container having perforated sides and an imperforate bottom and an annular space therein for desiccant materials, means to hold and expose said desiccant materials and means to catch and retain moisture descending from said desiccant, a cover for said container, a pair of spaced electrodes positioned within said container, the lower ends of said electrodes being disposed close to the bottom of said container in which excess moisture may accumulate to form an electrical conducting medium, the other ends of said electrodes being adapted for connection through said container cover to an external source of alternating current and an electrically actuated alarm means, whereby closure of the electrical circuit by formation of said conducting medium bridging said spaced electrodes results in actuation of said alarm means.

References Cited in the file of this patent

UNITED STATES PATENTS

| | | |
|---|---|---|
| 894,973 | Morgan | Aug. 4, 1908 |
| 2,471,442 | Morf | May 31, 1949 |
| 2,792,566 | Shanhouse | May 14, 1957 |
| 2,839,741 | Kratville | June 17, 1958 |

UNITED STATES PATENT OFFICE
CERTIFICATE OF CORRECTION

Patent No. 3,142,830                          July 28, 1964

Robert L. Patrick et al.

It is hereby certified that error appears in the above numbered patent requiring correction and that the said Letters Patent should read as corrected below.

Column 4, line 29, for "circuits successively, and observe when" read -- activated the audio signal. --.

Signed and sealed this 24th day of November 1964.

(SEAL)
Attest:

ERNEST W. SWIDER
Attesting Officer

EDWARD J. BRENNER
Commissioner of Patents